June 4, 1929.  C. H. RUTH  1,715,627
EXCAVATOR DRIVE
Filed March 15, 1926    3 Sheets-Sheet 1

INVENTOR
Charles H. Ruth
BY John Flam
HIS ATTORNEY

June 4, 1929.  C. H. RUTH  1,715,627
EXCAVATOR DRIVE
Filed March 15, 1926   3 Sheets-Sheet 2

INVENTOR
Charles H. Ruth
BY John Flam
HIS ATTORNEY

June 4, 1929.  C. H. RUTH  1,715,627
EXCAVATOR DRIVE
Filed March 15, 1926   3 Sheets-Sheet 3
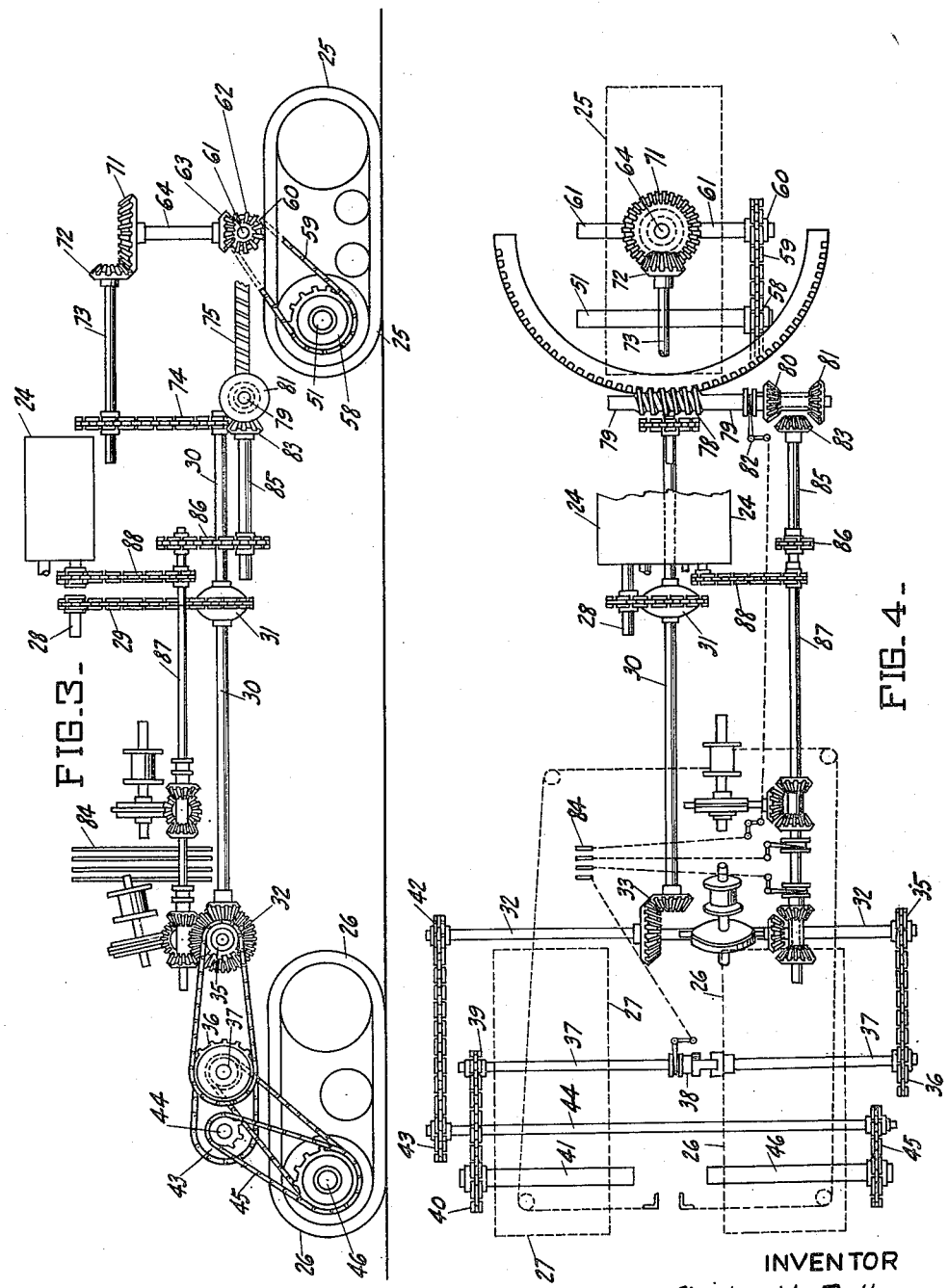
INVENTOR
Charles H. Ruth
BY John Flam
HIS ATTORNEY

Patented June 4, 1929.

1,715,627

UNITED STATES PATENT OFFICE.

CHARLES H. RUTH, OF WALNUT PARK, CALIFORNIA, ASSIGNOR TO RUTH DREDGER MANUFACTURING COMPANY, OF HUNTINGTON PARK, CALIFORNIA, A CORPORATION OF CALIFORNIA.

EXCAVATOR DRIVE.

Application filed March 15, 1926. Serial No. 94,810.

In such activities as in the laying of underground pipes or conduits, or in providing irrigation for farming, it is convenient to utilize an excavator or dredger for forming ditches; and such dredgers have in fact been in common use in recent years. Many of these excavators or dredgers are provided with their own means of locomotion, such as power driven crawlers, and they are arranged to move at a slow rate and simultaneously to dig the trench or ditch, the movement of the entire dredger being in the direction in which the ditch or trench is to extend. It is one of the objects of my invention to improve in general this type of apparatus.

It is another object of my invention to provide a more secure drive for such excavators, and particularly by arranging that all of the supports, such as crawlers, for the apparatus be power driven. In this way, a better mode of locomotion is provided. It is accordingly still another object of my invention to provide traction for the dredger which is so arranged that although power driven, may yet be properly angled to secure steering. In this connection, the dredger or excavator is purposely provided with several crawlers at the rear, but with only one steering crawler at the front, whereby the steering operation is facilitated, and the mechanism therefor is simplified.

My invention possesses many other advantages, and has other objects which may be made more easily apparent from a consideration of one embodiment of my invention. For this purpose I have shown a form in the drawings accompanying and forming part of the present specification. I shall now proceed to describe this form in detail, which illustrates the general principles of my invention; but it is to be understood that this detailed description is not to be taken in a limiting sense, since the scope of my invention is best defined by the appended claim.

Referring to the drawings:

Figs. 3 and 4 are diagram views, in elevation and plan respectively, illustrating the mode in which power is transmitted to the crawlers.

Figure 1:
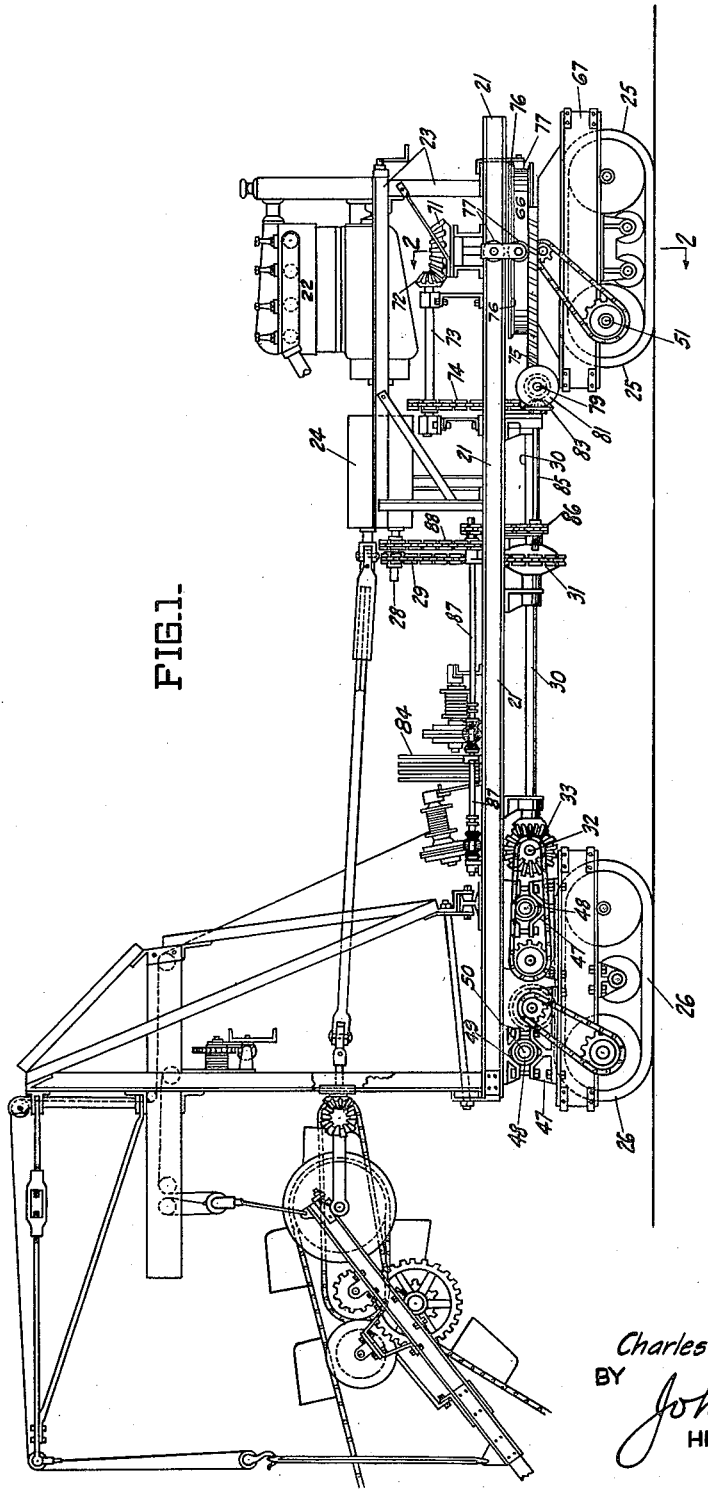
Figure 1 is a side view, substantially complete, of a dredger embodying my invention.
Figure 2:
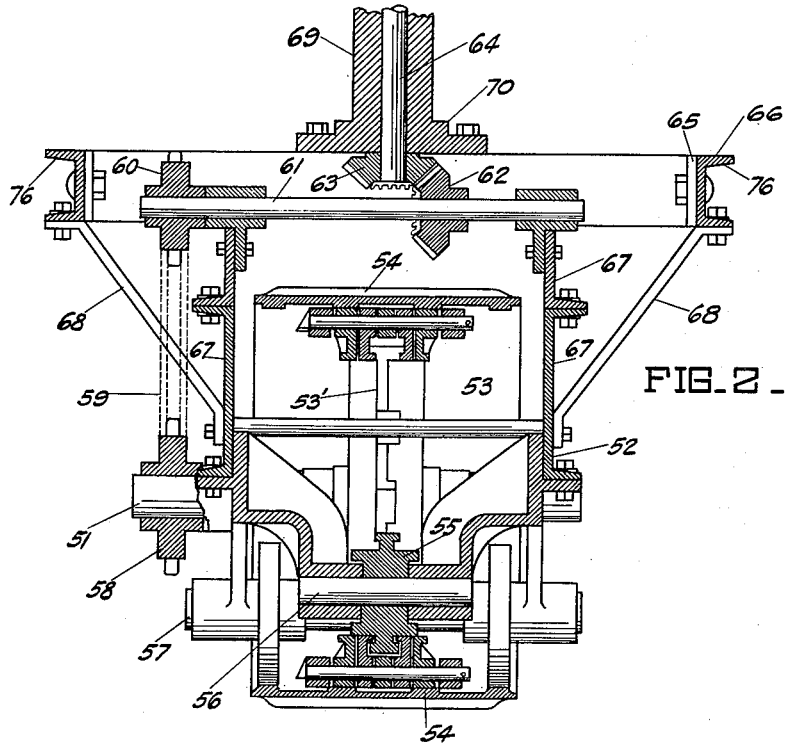
Fig. 2 is a sectional view of the front crawler, taken along plane 2—2 of Fig. 1.

The dredger comprises a body or carriage 21, shown in this instance as appropriately made from structural steel, and as provided with devices for causing it to travel along the ground. The prime mover for supplying the power for this purpose, and for all other power moved elements is shown in this instance as a conventional gasoline engine 22 (Fig. 1) located near the front of the mechanism on a framework 23 above the body 21. This engine drives a transmission mechanism 24 located for convenience adjacent the rear of the engine 22.

In the present instance, a plurality of crawlers 25, 26, and 27 (Figs. 1, 3 and 4) is used to move the excavator along the ground; crawler 25 is located in front, while the other two are at the rear. Since the crawlers can be of any well-known form of construction, details thereof will not be minutely described, but only in so far as essential to an understanding of the present invention. The mode in which power is supplied to the crawlers will now be set forth.

Referring more particularly to Figs. 1, 2, 3 and 4, the transmission 24 has a shaft 28, which drives, as by a sprocket chain 29, a longitudinally supported shaft 30, located beneath frame 21. This drive is accomplished through a conventional differential gear mechanism 31, which mechanically connects the rearwardly extending portion of the shaft 30 (transmitting power to the rear crawlers 26 and 27), and the forwardly extending portion (transmitting power to the front crawler 25). Adjacent the rear of the frame 21, there is a transverse shaft 32, which is driven as by the aid of bevel gearing 33, from shaft 30. The shaft 32 carries at one end, a sprocket wheel 35, which is connected by a chain to wheel 36 mounted on shafting 37. At the other end, shafting 37 carries sprocket wheel 39, which is mechanically connected to wheel 40 on main drive shaft 41 of crawler 27. A manually controlled clutch 38 can be provided, to control the drive between shafting 37 and wheel 39.

A similar arrangement is provided for the other rear crawler 26. This drive includes a sprocket wheel 42 connected to shaft 32, and driving sprocket 43 on a transverse shaft 44, which in turn is connected by sprocket mechanism 45, with the main drive shaft 46 of crawler 26.

It is possible to adjust the width of tread between the rear crawlers 26 and 27, by spacing them apart the proper distance. This is sometimes necessary in order that the dredger may properly straddle such obstructions as ditches or mounds or ridges. The adjustment is facilitated by the manner in which the rear crawlers support the rear of frame 21. Each of these crawlers carries, at its upper side, a series of V-shaped seats 47, in which a pair of transverse pipes 48 is accommodated. Clamps 49 serve to clamp the pipes 48 to the crawlers. The crawlers 26 and 27 can be moved close together or further apart along pipes 48 or their extensions, such as 50, which telescope in pipes 48. In this way, an extended tread can readily be obtained. In order to take care of this extension, the transverse shaftings such as 32, 37 and 44, for driving the rear crawlers 26 and 27, and shown diagrammatically in Fig. 4, can be made telescopic.

Since, in order to steer the dredger, the front crawler 25 must be capable of being turned from parallelism with the center line of frame 21, or "angled", it is obvious that a special drive to permit this, must be provided. This crawler has a main drive shaft 51 (Figs. 1 and 2) which extends in this instance completely through the framework 52. This framework provides a hollow interior space 53 (Fig. 2) within which the various front crawler parts are accommodated. Thus the cog wheel 53' engaging the linked tread 54 is mounted on shaft 51; a smaller cog wheel 55 serves as a guiding idler for the tread, and is journaled on shaft 56 on framework 52. Further guides may if desired be provided, and can be mounted on other shafts such as 57.

Main drive shaft 51 has attached to it a sprocket wheel 58, driven by chain 59, passing over a driving sprocket wheel 60. This wheel is fastened to a transverse shaft 61 mounted in the crawler framework and rigidly carries a bevel gear 62. This gear is in mesh with a gear 63 mounted on the end of a vertically alined shaft 64. This shaft is supported in a bearing 69, fastened on a framing 65, which extends across a ring 66 fastened to the crawler channels 67, by the struts 68. The purpose of ring 66 will be hereinafter described. The bearing 69 is also arranged with a step bearing portion 70 upon which the lower surface of frame 21 can rest, while yet permitting the angling movement of crawler 25 for steering. The shaft 64 is appropriately driven from transmission 24, as by the aid of the bevel gear 71 (Figs. 3 and 4), which is fastened to shaft 64; and the bevel pinion 72 on a countershaft 73. This shaft has a sprocket chain drive 74 from the front end of the power shafting 30.

In order to rotate the crawler 25 about the vertical shaft 64 for steering, use is made of a segmental worm gear 75 fastened in this instance to the lower flange of the horizontal ring 66. The upper flange 76 is used as a guide for keeping the crawler 25 in proper alinement as it is moved about the vertical axis. For this purpose, a series of pulleys 77 on stationary axes is provided, and supported on frame 21, which pulleys engage the flange 76. The worm wheel segment 75 is arranged to be driven by a worm 78 (Fig. 4) fastened to a transverse shaft 79. This shaft has splined to it, a pair of opposed bevels 80 and 81, which are arranged to be moved axially by a fork 82, in a well-known manner, so that either one or the other bevels, or neither, may be placed in mesh with constantly driven pinion 83. It is evident that the segment 75, and consequently the entire crawler 25, will be rotated relatively to the frame 21, in either direction, depending upon which bevel gear 80 or 81 is in mesh with the pinion 83. When no movement is desired, fork 82 remains in the neutral position shown, in which pinion 83 is out of engagement with each of the bevels 80 and 81.

The control fork 82 is indicated merely diagrammatically, since the manner in which this can be accomplished is well-known. A hand lever 84 is accordingly indicated as in mechanical connection with fork 82.

The motion of pinion 83 is provided from a shaft 85, which is driven by chain 86, from a shaft 87, in turn driven by sprocket chain 88 from transmission 24.

Although other features of the dredger mechanism are illustrated, these are described and claimed in a copending application, filed in my name concurrently herewith, under Serial No. 94,809 and entitled "Excavator".

I claim:

In a vehicle, a crawler structure having a box-like casing and a horizontal shaft extending out of the casing for driving the crawler, a counter-shaft parallel to said horizontal shaft and above it, said counter-shaft being pivotally supported on the box-like structure, a mechanical connection between the two shafts, a bevel gear on the counter-shaft, a ring-like structure above the casing and in a horizontal position, rods connecting the casing and the ring so as to support it above the crawler, a vertical bearing coaxial with the ring and providing a step bearing for the frame, a vertical shaft in said bearing, a bevel gear on said vertical shaft meshing with the gear on the countershaft, means for driving said vertical shaft, and roller guides carried by the frame and engaging the ring.

In testimony whereof I have hereunto set my hand.

CHARLES H. RUTH.